J. T. MALONEY.
FISHING TOOL.
APPLICATION FILED SEPT. 15, 1920.
1,385,633.
Patented July 26, 1921.
2 SHEETS—SHEET 1.
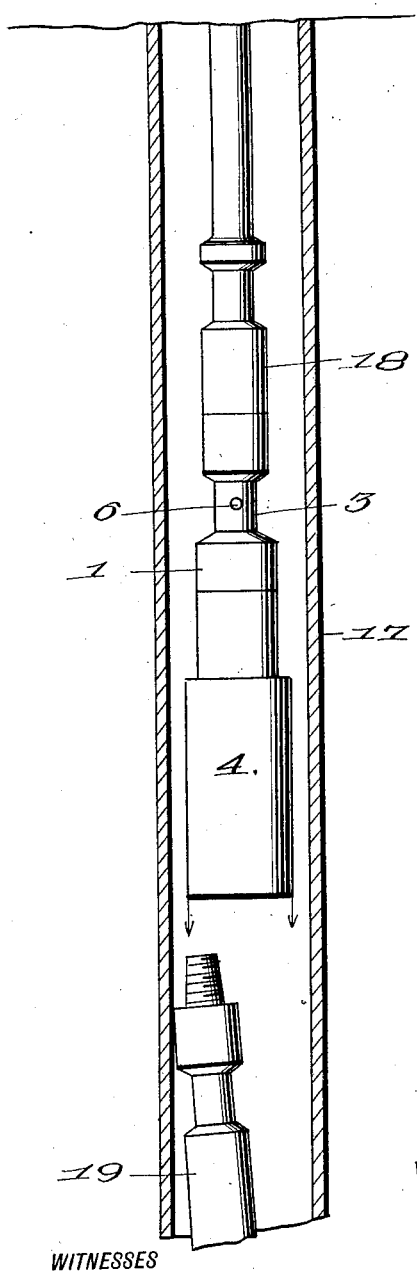
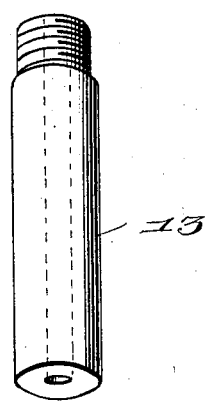
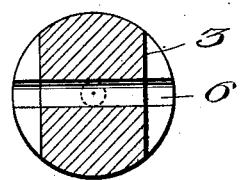
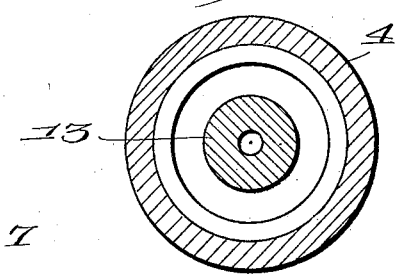
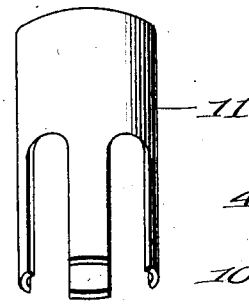
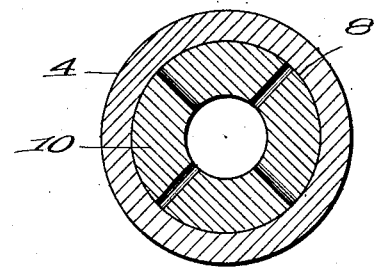
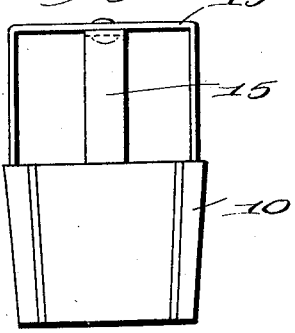
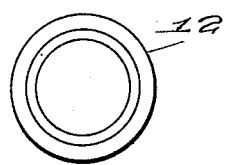
WITNESSES
R. E. Rousseau,
C. E. Trainor.
INVENTOR
J. T. Maloney,
BY
ATTORNEYS

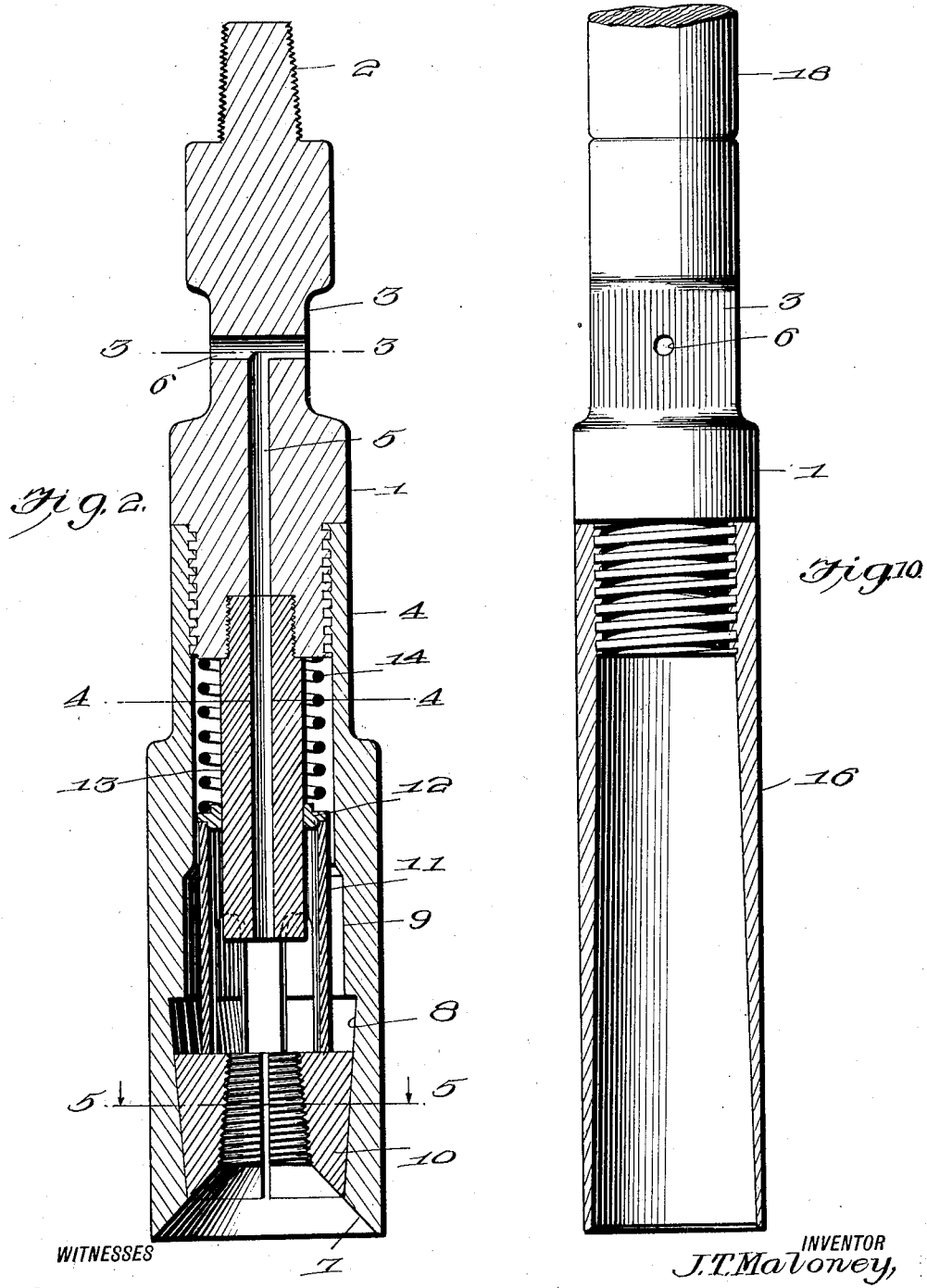

UNITED STATES PATENT OFFICE.

JAMES TEMOTHY MALONEY, OF TULSA, OKLAHOMA.

FISHING-TOOL.

1,385,633.

Specification of Letters Patent.  Patented July 26, 1921.

Application filed September 15, 1920. Serial No. 410,365.

*To all whom it may concern:*

Be it known that I, JAMES T. MALONEY, a citizen of the United States, and a resident of Tulsa, in the county of Tulsa and State of Oklahoma, have invented certain new and useful Improvements in Fishing-Tools, of which the following is a specification.

My invention is an improvement in fishing tools, and has for its object to provide a tool of the character specified for finding and removing lost bits or other tools from a well, wherein the fishing tool comprises a socket for receiving the end of a lost bit or other tool, having means for tightly gripping the lost bit or other tool when engaged with the socket, to permit the bit or other tool to be withdrawn.

In the drawings:

Figure 1 is a front view showing the improved tool in use, with the well casing in section;

Fig. 2 is a longitudinal section of the socket portion of the tool;

Figs. 3, 4 and 5 are sections on the lines 3—3, 4—4 and 5—5, respectively, of Fig. 2;

Fig. 6 is a perspective view of the jarring pin.

Fig. 7 is a perspective view of the spacing sleeve,

Fig. 8 is a side view of the bits,

Fig. 9 is a top plan view of the collar.

Fig. 10 is a view partly in section of a modified form of the socket.

In the present embodiment of the invention the socket head 1 has a threaded tapering stem 2 for engagement by the drill stem and a gripping surface 3 for a wrench or the like is provided intermediate the ends of the head. The lower end of the head is annularly reduced and provided with a square thread, as shown, for engagement by the body 4 of the socket, the said body having threaded engagement with the socket and abutting at its upper end the shoulder formed between the threaded portion and the head.

This head, as shown in Fig. 2, has an axial opening 5, which connects at its upper end with a cross opening 6 at the gripping surface 3. These openings 5 and 6 are for permitting the upward passage of water through the head. The socket body 4 has the lower end of the bore tapering outwardly or flaring, as shown at 7, and just above the flaring portion the bore is enlarged to form a tapering portion 8, whose large end is upward, the wall of the portion 8 meeting the wall of the portion 7 at an obtuse angle.

Slips 10 are arranged within the portion 8, the peripheral surfaces of the slips fitting the said surface 8. A sleeve 11 is arranged above the slips, the lower end of the sleeve resting on the slips, and at its lower end this sleeve is slotted longitudinally, the slots extending approximately half the length of the sleeve. At its upper end the sleeve engages a collar 12 which is mounted to slide on a depending pin 13 connected with the head 1 of the socket, and a coil spring 14 is arranged between the collar 12 and the lower end of the head. This spring acts normally to force the collar and the sleeve 11 downward, holding the lower end of the sleeve against the slips and pressing the slips toward the lower small end of the tapered portion 8. The upper end of the jarring pin is reduced and threaded to engage a threaded opening in the lower end of the head, and the jarring pin has an axial opening registering with the opening 5.

As shown more particularly in Fig. 8 the slips 10 are four in number, and they are connected at their tops by yokes 15, the bodies of the yokes crossing and being connected, while the arms of the yokes are connected with the slips.

In Fig. 10 there is shown a modified form of socket or attachment to be used in fishing for smaller tools. In this arrangement the body 16 of the socket has its bore tapering or flaring from the top to the bottom and it has a square thread at its upper end for engaging the reduced portion of the head 1, with which head it is used.

In operation, the improved tool, with the parts arranged as shown in Fig. 2, is lowered into the well casing indicated at 17, the tool being connected with the drill stem, indicated at 18. The tool 19 to be recovered will occupy the leaning position shown in Fig. 1, and it is necessary that the socket body be dropped down over the top of the tool. With this object in view the socket is manipulated until it drops down over the tool. As the upper end of the tool passes into the socket the slips are raised, compressing the spring 14. The slips as they move upwardly, will move outwardly, that is, they may expand, and eventually the tool will slip into the space between the slips.

It will be noticed that the inner faces of the slips are roughened or corrugated to firmly grasp the tool, and it will be evident that as soon as the fishing tool is drawn upward, the slips, by their engagement with the lost tool and because of the spring 14, will be moved downwardly and will tightly grip the tool. The bore formed by the coöperation of the four slips gradually decreases in cross section from below upward.

I claim:

1. In fishing tools, a socket having its bore provided with an inwardly flaring portion near its lower end, and slips in the said portion having inclined outer walls coöperating with the walls of the flaring portion to move the slips inwardly when they are moved forwardly, a jarring pin connected with the socket and extending coaxially of the bore from the upper end toward the slips, a sleeve encircling the jarring pin and resting at its lower end on the slips, and a spring between the upper end of the sleeve and the socket, said jarring pin and socket having openings for permitting the discharge of water from the socket upwardly and outside of the same.

2. In fishing tools, a socket having its bore provided with an inwardly flaring portion near its lower end, and slips in the said portion having inclined outer walls coöperating with the walls of the flaring portion to move the slips inwardly when they are moved forwardly, a jarring pin connected with the socket and extending coaxially of the bore from the upper end toward the slips, a sleeve encircling the jarring pin and resting at its lower end on the slips, and a spring between the upper end of the sleeve and the socket.

JAMES TEMOTHY MALONEY